United States Patent
Ooma et al.

(10) Patent No.: US 6,893,759 B2
(45) Date of Patent: May 17, 2005

(54) POLYMER ELECTROLYTE FUEL CELL STACK

(75) Inventors: Atsushi Ooma, Yokohama (JP); Yasuji Ogami, Yokohama (JP); Hiroshi Chizawa, Yokohama (JP); Michio Hori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/758,421

(22) Filed: Jan. 16, 2004

(65) Prior Publication Data

US 2004/0151954 A1 Aug. 5, 2004

Related U.S. Application Data

(63) Continuation of application No. PCT/JP01/06252, filed on Jul. 18, 2001.

(51) Int. Cl.[7] ............................. H01M 8/04; H01M 8/02
(52) U.S. Cl. .............................. 429/26; 429/38; 429/39
(58) Field of Search ........................... 429/26, 30, 34, 429/38, 39

(56) References Cited

U.S. PATENT DOCUMENTS 5,234,776 A    8/1993  Koseki 6,329,094 B1 * 12/2001  Yasuo et al. .................. 429/34

FOREIGN PATENT DOCUMENTS

| JP | 7-220746 | 8/1995 |
|---|---|---|
| JP | 11-73979 | 3/1999 |
| JP | 2000-164230 | 6/2000 |
| JP | 2000-243419 | 9/2000 |
| JP | 2001-283879 | 10/2001 |

* cited by examiner

Primary Examiner—Jonathan Crepeau
(74) Attorney, Agent, or Firm—Oblon, Spivak, McClelland, Maier & Neustadt, P.C.

(57) ABSTRACT

In a polymer electrolyte fuel cell stack using a latent heat cooling system, a plurality of first reactant gas flow paths formed in one plate surface of each separator are made substantially linear in the vertical direction, and an arrangement capable of supplying water to the first reactant gas flow paths includes a water manifold formed to extend through the separator, a water supply path branched from the water manifold and horizontally formed in a surface in which second reactant gas flow paths are formed, and communication holes horizontally formed in a first reactant gas flow path introducing portion to allow the water supply path to communicate with the first reactant gas flow paths, and present above the lowermost portion in the vertical direction of the water manifold. With this arrangement, stable power generation can be performed regardless of, e.g., the stack installation angle or vibrations.

8 Claims, 5 Drawing Sheets

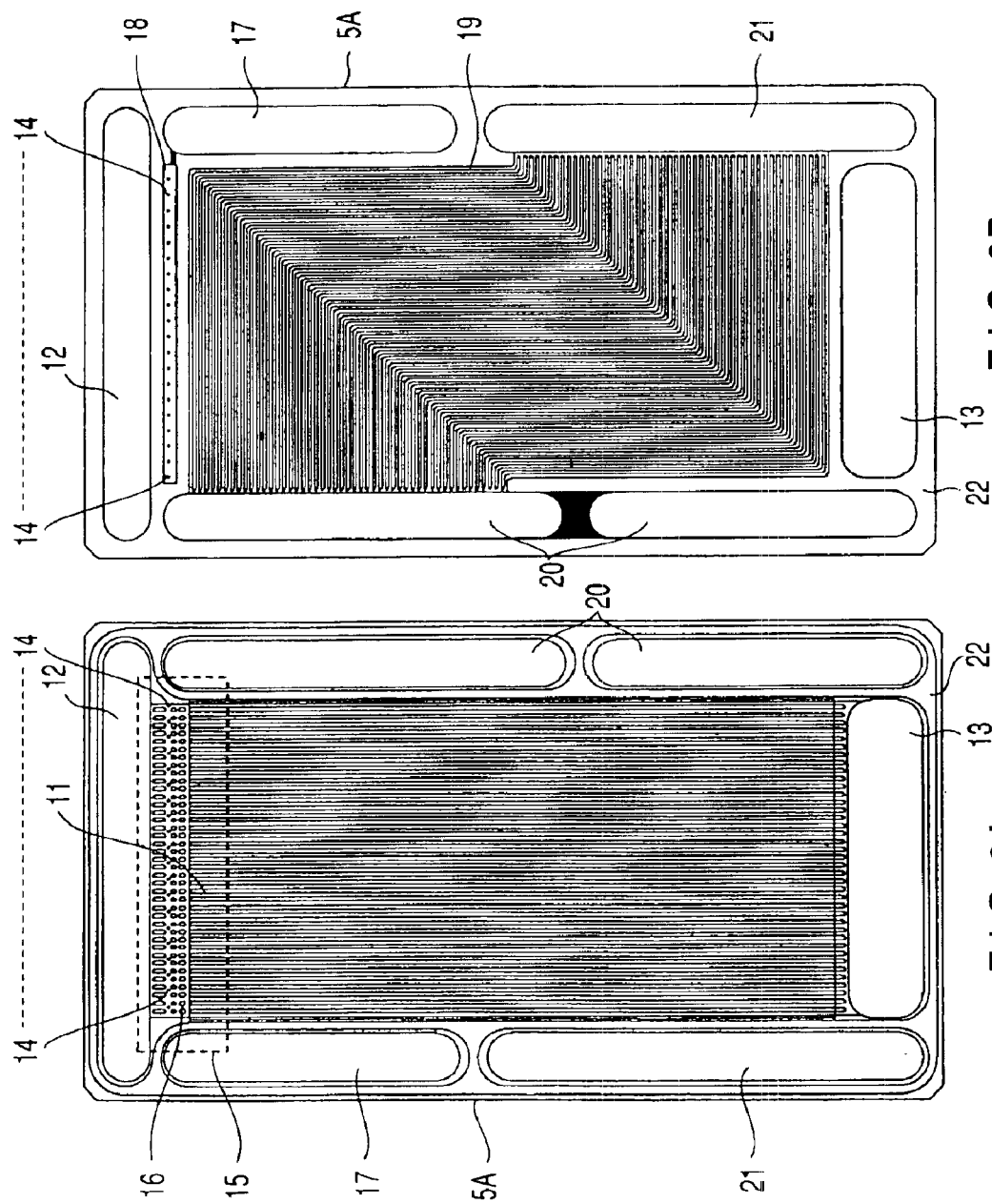

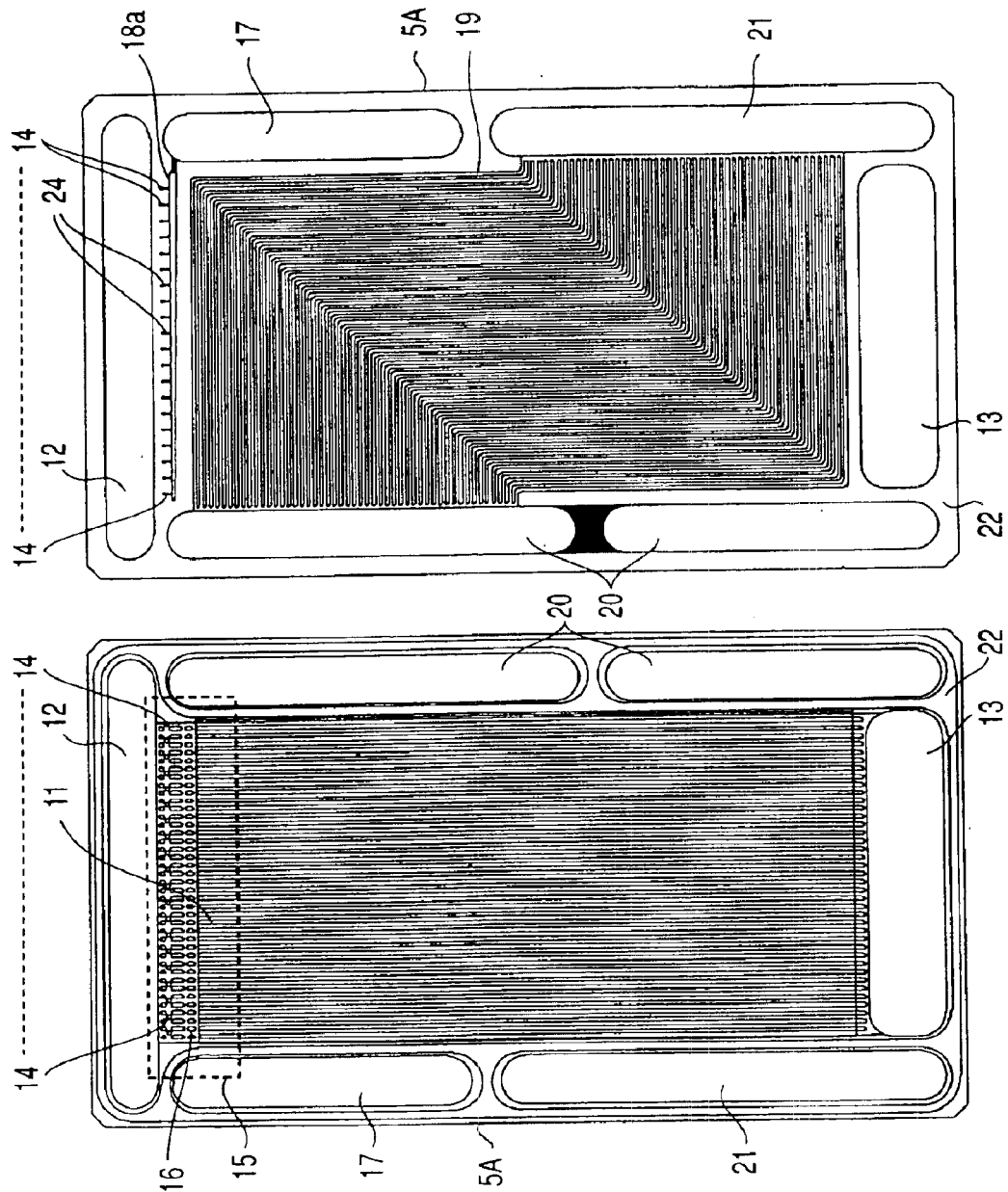

POLYMER ELECTROLYTE FUEL CELL STACK

CROSS-REFERENCE TO RELATED APPLICATIONS

This is a Continuation Application of PCT Application No. PCT/JP01/06252, filed Jul. 18, 2001, which was not published under PCT Article 21(2) in English.

BACKGROUND OF THE INVENTION

1. Field of the Invention

The present invention relates to a polymer electrolyte fuel cell stack using a polymer having ion conductivity as an electrolyte.

2. Description of the Related Art

FIG. 6 is a vertical sectional view for explaining an example of prior art (Jpn. Pat. Appln. KOKAI Publication No. 1-140562) of a polymer electrolyte fuel cell stack disclosed in Japan.

In this polymer electrolyte fuel cell stack, a plurality of unit cell main components 7 are mechanically stacked in the vertical direction, and the unit cell main components 7 are electrically connected in series with each other.

Each unit cell main component 7 includes a membrane electrode assembly 3 and separator 5. The membrane electrode assembly 3 is obtained by forming a fuel electrode 2a and oxidizer electrode 2b on the opposing plate surfaces of a proton exchange membrane 1.

In the membrane electrode assembly 3, several through holes for forming a plurality of manifolds are formed in the left and right edges in the vertical direction of the proton exchange membrane 1. The separator 5 functions as a fuel side collector and oxidizer side collector, and has a fuel gas flow path 9a and oxidizer gas flow paths 9b. A seal 6 is formed between the peripheries of the proton exchange membrane 1 and separator 5 in the vicinities of electrodes 2a and 2b.

Since the proton exchange membrane 1 also has a function of preventing mixing of reactant gases supplied to the electrodes 2a and 2b, the area of the proton exchange membrane 1 is normally larger than that of the electrodes.

In the upper and lower end portions of the stack in which the plurality of unit cell main components 7 are stacked, current extracting plates 31, insulating plates 32, fastening plates 33, fastening jigs (fastening studs 34 and springs 35), a fuel gas supply pipe 36, a fuel gas exhaust pipe 37, an oxidizer gas supply pipe 38, an oxidizer gas exhaust pipe 39, a water supply pipe 40, and a water discharge pipe 41 are arranged.

Current extracting cables are placed in the current extracting plates 31 and connected to an external load. Also, the fastening plates 33 are required to be rigid in order to fasten the whole stack evenly.

The stack is required to make various conditions, such as the reactant gas flow, water flow, temperature, and humidity in the stacking direction, as even as possible in all the stacked unit cells 7.

In conventional polymer electrolyte fuel cell stacks before the above prior art, cooling means for discharging heat generated by power generation is generally a system by which a cooling plate in which a coolant such as pure water or an anti-freeze flows is inserted between unit cell main components.

In the above prior art, however, by supplying water (pure water) to the fuel electrode 2a through the fuel gas supply flow path 9a, a cooling plate can be eliminated by evaporating water moved from the fuel electrode 2a to the oxidizer electrode 2b and water generated by the oxidizer electrode 2b, in addition to the humidifying function of the proton exchange membrane 1.

Unfortunately, the above-mentioned prior art of the polymer electrolyte fuel cell stack has the following problems.

(1) If water stays in the fuel gas flow paths, not only the flow of the water but also the flow of the fuel gas or oxidizer gas becomes nonuniform in some cases to produce a large unit cell voltage distribution in the stack, and make stable power generation impossible. Similarly, when the stack is activated or stopped, water sometimes readily stays in the fuel gas flow paths to pose the same problem.

(2) The flow of water to be supplied to the fuel gas becomes nonuniform in some cases depending on the stack installation conditions, e.g., if the installation angle changes or vibrations occur. This sometimes produces a distribution of the humidifying conditions or latent heat cooling amount of each unit cell, thereby making stable power generation impossible.

An aspect of the present invention provides a polymer electrolyte fuel cell stack in which no water stays in gas flow paths, and which can stably generate electric power regardless of, e.g., the stack installation angle or vibrations.

BRIEF SUMMARY OF THE INVENTION

An invention corresponding to a first aspect is a polymer electrolyte fuel cell stack comprising a plurality of unit cell main components juxtaposed in the same direction and electrically connected in series with each other, wherein each unit cell main component comprises a membrane electrode assembly including a proton exchange membrane, and a fuel electrode and oxidizer electrode placed on opposing plate surfaces of the proton exchange membrane, a separator including, except for those placed at end portions in the direction of juxtaposition, a plurality of fuel gas flow paths to supply a fuel gas, formed substantially linearly in a vertical direction in a plate surface to be brought into contact with the fuel electrode, and an oxidizer gas flow path to supply an oxidizer gas, formed in a plate surface to be brought into contact with an oxidizer electrode of an adjacent membrane electrode assembly different from the predetermined membrane electrode assembly, and water supply means for cooling the unit cell main component by a latent heat system by supplying water to the fuel gas flow paths, the water supply means including a water manifold formed in the vertical direction to extend through the separator, a water supply path positioned, in the surface in which the oxidizer gas flow path is formed, above a lowermost portion in the vertical direction of the water manifold, and continuously formed in a horizontal direction, and a plurality of communication holes formed in the water supply path so as to allow the water supply path to communicate with the fuel gas flow paths.

An invention corresponding to a second aspect is a polymer electrolyte fuel cell stack comprising a plurality of unit cell main components juxtaposed in the same direction and electrically connected in series with each other, wherein each unit cell main component comprises a membrane electrode assembly including a proton exchange membrane, and a fuel electrode and oxidizer electrode placed on opposing plate surfaces of the proton exchange membrane, a separator including, except for those placed at end portions in the direction of juxtaposition, a plurality of fuel gas flow paths to supply a fuel gas, formed substantially linearly in a vertical direction in a plate surface to be brought into contact with the fuel electrode, and an oxidizer gas flow path to supply an oxidizer gas, formed in a plate surface to be brought into contact with an oxidizer electrode of an adjacent membrane electrode assembly different from the predetermined membrane electrode assembly, and water supply means for cooling the unit cell main component by a latent heat system by supplying water to the fuel gas flow paths, the water supply means including a water manifold formed in the vertical direction to extend through the separator, a first water supply path positioned, in the surface in which the oxidizer gas flow path is formed, above a lowermost portion in the vertical direction of the water manifold, and continuously formed in a horizontal direction, a plurality of communication holes formed with a predetermined spacing from the first water supply path so as to communicate with the fuel gas flow paths, and a plurality of second water supply flow paths which are formed between the communication holes and first water supply path so as to allow the communication holes to communicate with the first water supply path, and which guide water in the first water supply path to the communication holes.

An invention corresponding to a third aspect is a polymer electrolyte fuel cell stack comprising a plurality of unit cell main components juxtaposed in the same direction and electrically connected in series with each other, wherein each unit cell main component comprises a membrane electrode assembly including a proton exchange membrane, and a fuel electrode and oxidizer electrode placed on opposing plate surfaces of the proton exchange membrane, a separator including, except for those placed at end portions in the direction of juxtaposition, a plurality of fuel gas flow paths to supply a fuel gas, formed substantially linearly in a vertical direction in a plate surface to be brought into contact with the fuel electrode, and an oxidizer gas flow path to supply an oxidizer gas, formed in a plate surface to be brought into contact with an oxidizer electrode of an adjacent membrane electrode assembly different from the predetermined membrane electrode assembly, and water supply means for cooling the unit cell main component by a latent heat system by supplying water to the fuel gas flow paths, the water supply means including a water manifold formed in the vertical direction to extend through the separator, a third water supply path positioned, in the surface in which the oxidizer gas flow path is formed, above a lowermost portion in the vertical direction of the water manifold, and continuously formed in a horizontal direction, a plurality of communication holes formed in the second water supply path so as to allow the third water supply path to communicate with the fuel gas flow paths, and a plurality of fourth water supply paths which are formed in the surface of the separator, in which the fuel gas flow paths are formed, and allow the communication holes to communicate with the fuel gas supply paths.

In the inventions corresponding to the first to third aspects, water supplied to the water supply path formed in the horizontal direction can be supplied to the plurality of fuel gas supply paths through the plurality of communication holes formed in the water supply path, so no water stays in the fuel gas supply paths any longer. Therefore, in the polymer electrolyte fuel cell stack using the latent heat cooling system, water supplied to the fuel gas evenly flows, each unit cell has a uniform voltage distribution and uniform temperature distribution, and stable power generation can be performed regardless of an activation/stop operation or the installation conditions such as the installation angle (inclination) or vibrations.

An invention corresponding to the fourth aspect is a polymer electrolyte fuel cell stack according to any one of the first to third aspects, further comprising capillarity generating means for generating a driving force when water in the water supply path flows into the communication holes.

An invention corresponding to a fifth aspect is a polymer electrolyte fuel cell stack according to the third aspect, further comprising, in each of the fourth water supply paths, capillarity generating means for generating a driving force when water flows from the communication holes to the fuel gas flow paths.

In the invention corresponding to the fourth or fifth aspect, the capillarity generating means is formed. Accordingly, in addition to the inventions corresponding to the first to third aspects, more stable power generation can be performed regardless of the stack installation angle.

An invention corresponding to a sixth aspect is a polymer electrolyte fuel cell stack according to any one of the first to fifth aspects, wherein the separator comprises a plurality of projections formed in a grid or zigzag pattern between the communication holes and fuel gas flow paths in the surface in which the fuel gas flow paths are formed.

In the stack according to the invention corresponding to the sixth aspect, the water supplied to the fuel cell can be mixed evenly by the projections, so more stable power generation can be done.

An invention corresponding to a seventh aspect is a polymer electrolyte fuel cell stack according to any one of the first to sixth aspects, wherein a sectional area of the first water supply path branched from the water manifold decreases away from the water manifold.

An invention corresponding to an eighth aspect is a polymer electrolyte fuel cell stack according to any one of the first to seventh aspects, wherein a pitch of the communication holes adjacent to each other is the multiples of a pitch of the fuel gas flow paths adjacent to each other.

The invention corresponding to the seventh or eighth aspect also achieves the same functions and effects as the inventions corresponding to the first to third aspects.

BRIEF DESCRIPTION OF THE SEVERAL VIEWS OF THE DRAWING

FIGS. 2A and 2B are views for explaining a separator shown in FIG. 1;

FIGS. 3A and 3B are views for explaining a separator of a polymer electrolyte fuel cell stack according to the second embodiment of the present invention;

DETAILED DESCRIPTION OF THE INVENTION (First Embodiment)

Figure 1:
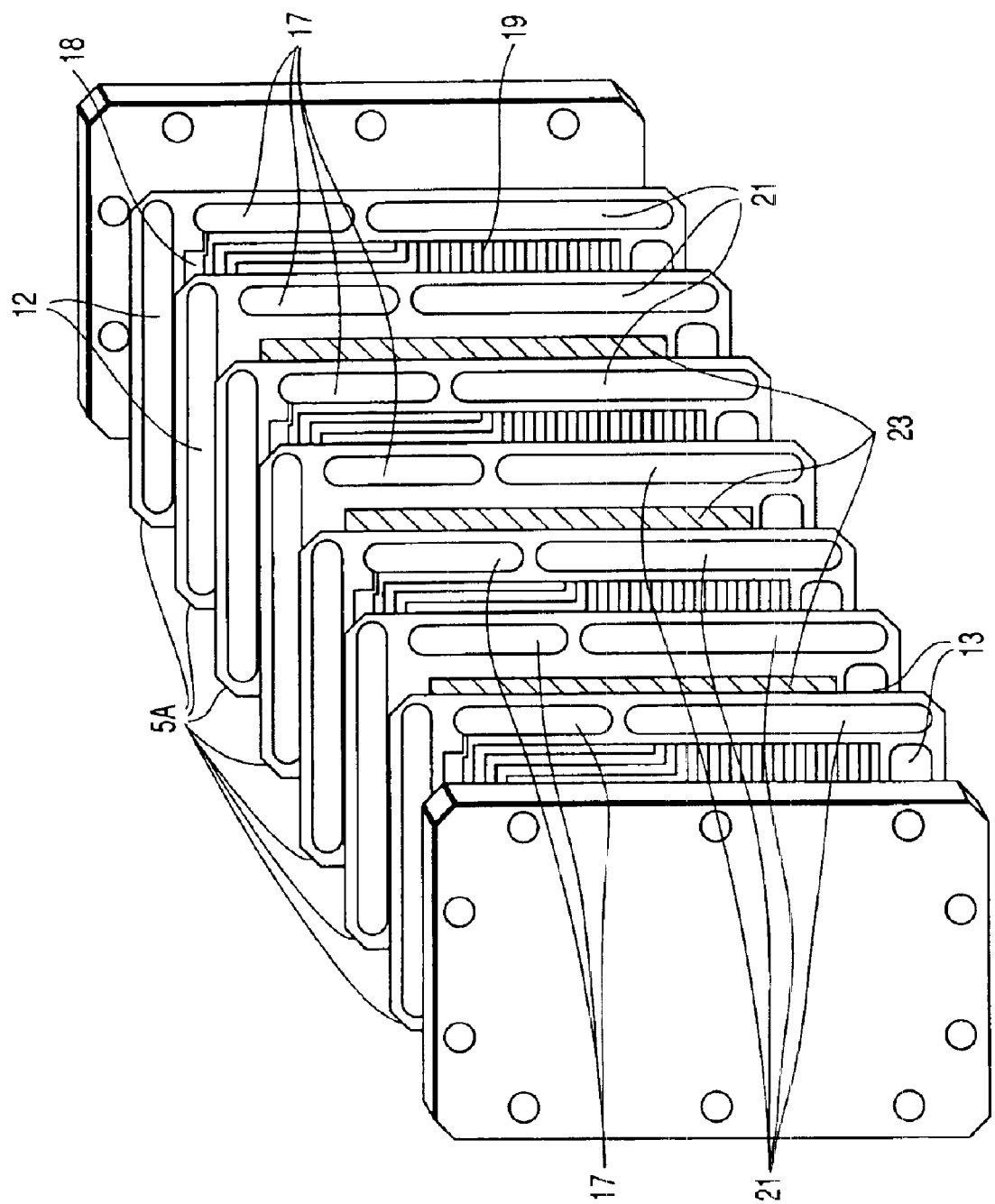
FIG. 1 is an exploded perspective view showing a polymer electrolyte fuel cell stack according to the first embodiment of the present invention.

FIG. 1 is an exploded perspective view showing an outline of the arrangement of a polymer electrolyte fuel cell stack according to the first embodiment of the present invention. This embodiment has a plurality of unit cell main components 7 (similar to FIG. 6) juxtaposed in the same direction and electrically connected in series with each other. Each unit cell main component 7 includes a membrane electrode assembly 23, separator 5A, and water supply means.

Figure 6:
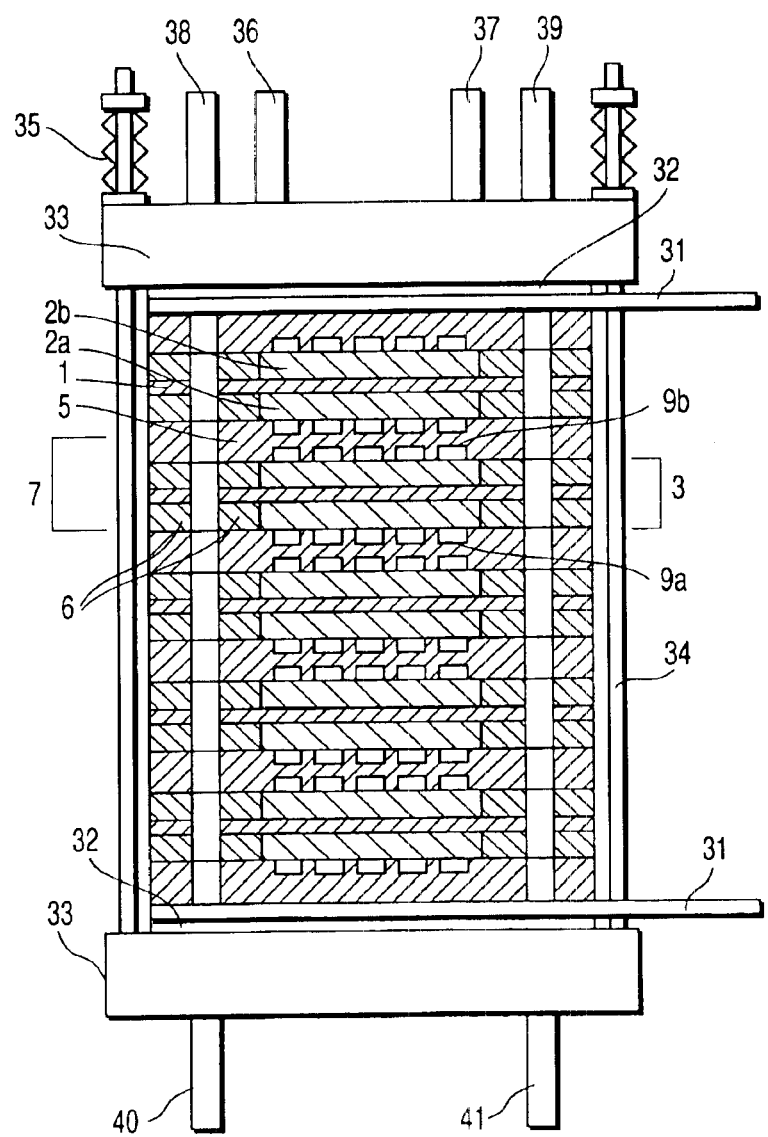
FIG. 6 is a longitudinal sectional view for explaining a polymer electrolyte fuel cell stack of prior art.

Similar to FIG. 6, the membrane electrode assembly 23 is obtained by forming a fuel electrode 2a and oxidizer electrode 1b on the opposing plate surfaces of a proton exchange membrane 1.

The separator 5A is formed as shown in FIGS. 2A and 2B. FIGS. 2A and 2B are front views showing one plate surface (a surface with which the fuel electrode 2a shown in FIG. 6 comes in contact) and the other plate surface (a surface with which the oxidizer electrode 2b shown in FIG. 6 comes in contact), respectively, of one separator 5A.

In the separator 5A except for the one placed in the end portion in the direction of juxtaposition, a plurality of fuel gas flow paths 11 for supplying a fuel gas are formed to be substantially linear in the vertical direction in the plate surface to be brought into contact with the fuel electrode 2a.

Also, in the separator 5A, a plurality of oxidizer gas flow paths 19 for supplying an oxidizer gas are formed in the plate surface to be brought into contact with the oxidizer electrode 1b of an adjacent membrane electrode assembly 23 different from the membrane electrode assembly 23.

The water supply means cools each unit cell main component 7 by a latent heat system by supplying water to each fuel gas flow path 11. This water supply means is made up of a water manifold 17 formed in the vertical direction through each separator 5A, a water supply path (in this embodiment, a plurality of linear trenches) 18 positioned, in the surface in which the oxidizer gas flow paths 19 are formed, above the lowermost portion in the vertical direction of the water manifold 17, and continuously formed in the horizontal direction, and a plurality of communication holes 14 formed in the water supply path 18 to allow it communicate with the fuel gas supply paths 11.

The fuel gas flow paths 11 are formed in a central portion except for the periphery of one plate surface of the separator 5A. For example, the fuel gas flow paths 11 are trenches linearly formed in the vertical direction at an array pitch of, e.g., 3 mm. Also, the oxidizer gas flow paths 19 are formed in a central portion except for the periphery of the other plate surface of the separator 5A. For example, the oxidizer gas flow paths 19 are trenches formed into a substantially Z shape in the vertical direction.

The horizontal water supply path 18 is formed above the oxidizer gas flow paths 19 in the other plate surface of the separator 5A. In addition, a plurality of communication holes 14 are formed at equal intervals in the water supply path 18 so as to communicate with a fuel gas flow path introducing portion 15 as the upper portion of the fuel gas flow paths 11. Each communication hole 14 is present above the lowermost portion in the vertical direction of the water manifold 17 to be described later.

As the communication holes 14, a plurality of, e.g., twenty holes each having a diameter of, e.g., 0.5 mm or less (except 0) are formed at an array pitch which is the multiples of the array pitch of the fuel gas flow paths 11, e.g., an array pitch of 6 mm.

In that plate surface of each separator 5A, in which the fuel gas flow paths 11 are formed, a plurality of projections (ribs) 16 are formed in a grid or zigzag pattern at equal intervals between the communication holes 14 and fuel gas flow paths 11.

On one side and on the other side in the horizontal direction of the periphery of each separator 5A, a fuel gas inlet gas manifold 12 and fuel gas outlet gas manifold 13 are so formed as to extend through these side portions in the direction of thickness.

On one side in the vertical direction of the periphery of each separator 5A, the water manifold 17 and an oxidizer gas outlet gas manifold 21 are formed. Also, in the upper and lower portions on the other side in the vertical direction of the periphery of each separator 5A, oxidizer gas inlet gas manifolds 20 are formed.

On the opposing plate surfaces of the separator 5A, a seal 22 for sealing is formed around the manifolds 12, 13, 17, 20, and 21, fuel gas flow paths 11, and oxidizer gas flow paths 19.

With this arrangement, an oxidizer gas branches in the direction of plane from the oxidizer gas inlet gas manifolds 20, and subsequently flows in the oxidizer gas flow paths 19 in the plane to reach the oxidizer gas outlet gas manifold 21. The effective area of the oxidizer gas flow paths 19, e.g., the area of a portion which comes in electrical contact with the membrane electrode assembly is, e.g., 288 cm$^2$.

In the first embodiment described above, water (pure water) from the water manifold 17 is supplied to the water supply path 18 formed in the horizontal direction in the separator 5A. This water supplied to the water supply path 18 is guided to the fuel gas flow path introducing portion 15 through the plurality of communication holes 14 formed in the water supply path 18. The water guided to the fuel gas flow path introducing portion 15 is dropped from the upper side to the lower side of the plurality of fuel gas flow paths 11.

In this structure as described above, water can be supplied in the same horizontal position (on the same horizontal level) to the individual fuel gas flow paths 11, and no water stays in these fuel gas flow paths.

Accordingly, in the polymer electrolyte fuel cell stack using the latent heat cooling system, water supplied to the fuel gas evenly flows, each unit cell has uniform humidifying conditions, a uniform voltage distribution, and a uniform temperature distribution, and stable power generation can be performed regardless of an activation/stop operation or the installation conditions such as the stack installation angle (inclination) or vibrations. The foregoing is also apparent from the following experimental results.

A plurality of, e.g., 200 unit cell main components 7 each including a membrane electrode assembly 23 obtained by forming a fuel electrode 2a and oxidizer electrode 2b on the opposing plate surfaces of a proton exchange membrane (1 in FIG. 6), and a separator 5A in which fuel gas flow paths 11 were formed in a plate surface to be brought into contact with the fuel electrode 2a of the membrane electrode assembly 23 and oxidizer gas flow paths 19 were formed in a plate surface to be brought into contact with the oxidizer electrode 2b of an adjacent membrane electrode assembly different from the membrane electrode assembly 23, were prepared. A polymer electrolyte fuel cell stack was manufactured by way of trial by mechanically juxtaposing the unit cell main components 7 in the same direction, and electrically connecting the unit cell main components 7 in series with each other. A power generation test was conducted by horizontally setting this stack.

The standard operating conditions were set such that reactant gases were hydrogen gas/air, the reactant gas pressure was 1 ata, the current density was 0.2 A/cm$^2$, the fuel gas utilization (Uf) was 70%, and the oxidizer gas utilization (Uox) was 40%. In addition, a stack activation/stop operation was repeated three times for every two hours.

The voltage of the 200 unit cells was average voltage ±1% or less.

Also, the temperature was measured by inserting a thermocouple into a central portion of the membrane electrode assembly 23 on the oxidizer electrode side of each of Nos. 1, 10, 20, 30, . . . , 190, and 200. Consequently, the temperature was average temperature ±1% or less in all the unit cells. Furthermore, even when the activation/stop operation was repeated, the stack voltage was reproducible and stable.

In addition, water could be supplied to the fuel gas on the same horizontal level, and no water stayed in the fuel gas flow paths even after the stack activation/stop operation was repeated, so the fuel gas and water were evenly mixed in the fuel gas flow paths.

Furthermore, even when the stack activation/stop operation was repeated, water supplied to the fuel gas evenly flowed, so each unit cell had a uniform voltage distribution and uniform temperature distribution, and the voltage was reproducible and stable.

Also, since the diameter of each communication hole 14 is 0.5 mm or less (excluding 0), a pressure loss required to realize an even flow of water to the communication holes 14 is obtained in each communication hole 14. Therefore, the amount of water to be supplied to the fuel gas becomes more uniform. Consequently, in the polymer electrolyte fuel cell stack using the latent heat cooling system, water supplied to the fuel gas evenly flows, each unit cell has uniform humidifying conditions, a uniform voltage distribution, and a uniform temperature distribution, and stable power generation can be performed regardless of an activation/stop operation or the installation conditions such as the stack installation angle (inclination) or vibrations.

Furthermore, the projections 16 arranged in a grid or zigzag pattern are formed in those side surfaces of the fuel gas flow paths 11, which are positioned below the communication holes 14 in the vertical direction. Accordingly, in the polymer electrolyte fuel cell stack using the latent heat cooling system, water supplied to the fuel gas is evenly mixed.

Also, the array pitch of the communication holes 14 is the multiples of the array pitch of the fuel gas flow paths 11. This improves the balance of flows of the fuel gas and water in the fuel gas flow paths in the polymer electrolyte fuel cell stack using the latent heat cooling system.

(Second Embodiment)

FIG. 3 is a view showing a separator to explain a polymer electrolyte fuel cell stack according to the second embodiment of the present invention. Similar to FIGS. 2A and 2B, FIGS. 3A and 3B are front views showing one plate surface (a surface in which fuel gas flow paths 11 are formed) and the other plate surface (a surface in which oxidizer gas flow paths 19 are formed), respectively, of one separator 5A.

This embodiment is the same as the embodiment shown in FIG. 2 in that a plurality of fuel gas flow paths 11 formed in one plate surface of each separator 5A are made substantially linear in the vertical direction, and different from the embodiment shown in FIG. 2 in the following respect.

That is, an arrangement capable of supplying water to the fuel gas flow paths 11 includes a water manifold 17 formed to extend through each separator 5A, a first water supply path 18a positioned, in the surface in which the oxidizer gas flow paths 19 are formed, above the lowermost portion in the vertical direction of the water manifold 17, and formed in the horizontal direction, a plurality of communication holes 14 formed at equal intervals with a predetermined spacing from the water supply path 18a so as to communicate with the fuel gas flow paths 11, and a plurality of second water supply flow paths 24 which are formed between the communication holes 14 and water supply path 18a so as to allow the communication holes 14 to communicate with the water supply path 18a, and which guide water in the water supply path 18a to the communication holes 14.

In this structure, the sectional area, e.g., the trench width, of the water supply path 18a decreases away from the manifold 17. The rest of the arrangement is the same as shown in FIG. 2.

This arrangement makes the pressure distribution in the water supply path 18a more uniform than that in the embodiment shown in FIG. 2, so the flow of water from each communication hole 14 to the fuel gas becomes more even.

More specifically, the array pitch of the fuel gas flow paths 11 is, e.g., 3 mm, and the number of fuel gas flow paths 11 is 40. Each fuel gas flow path 11 is linear (straight flow) in the vertical direction, and extends from a fuel gas inlet gas manifold 12 in the upper portion to a fuel gas outlet gas manifold 13 in the lower portion.

The array pitch of the communication holes 14 is the multiples of the array pitch of the fuel gas flow paths 11, e.g., 6 mm, the number of communication holes 14 is 20, and the diameter of the hole is 0.5 mm. The communication holes 14 are horizontally arranged in a fuel gas flow path introducing portion 15.

To generate a capillary force by capillarity, a typical diameter of each water supply flow path 24 is 0.2 mm. This capillary force generated by each water supply flow path 24 so functions as to drive water filled in the water supply path 18a toward the communication hole 14.

A plurality of projections 16 are formed in a grid or zigzag pattern below the communication holes 14 and between the fuel gas flow paths 11, so that water supplied to the fuel gas is evenly mixed.

The water supply path 18a horizontally branched from the upper portion of the water manifold 17 is formed in the same plane as the oxidizer gas flow paths 19, and connected to the communication holes 14 via the twenty water supply flow paths 24. The typical diameter of the water supply flow paths 24 is 0.2 mm, and water filled in the water supply path 18a moves to the communication holes 14 by the capillary force. The width of the water supply path 18a decreases away from the water manifold 17. Also, an oxidizer gas branches in the direction of plane from oxidizer gas inlet gas manifolds 20, flows zigzag in the vertical direction in the oxidizer gas flow paths 19 in the plane, and reaches an oxidizer gas outlet gas manifold 21. An effective cross-sectional area as a portion in which the gas flow paths are formed and which is brought into contact with a membrane electrode assembly is 288 cm$^2$. Also, a seal 22 is formed around the manifolds, effective portion, and outer shape portion, and integrated with the separator.

A polymer electrolyte fuel cell stack having a repetitive structure in which the separators and film electrode composite bodies 23 (not shown, electrode area=288 cm$^2$) were adjacent to each other, and the number of film electrode composite bodies 23 (the number of unit cells) was 200, was manufactured by way of trial. A power generation test was conducted by installing the stack at an installation angle of about 10° from the horizontal direction. The standard operating conditions were set such that reactant gases were hydrogen gas/air, the reactant gas pressure was 1 ata, the current density was 0.2 A/cm$^2$, the fuel gas utilization (Uf) was 70%, and the oxidizer gas utilization (Uox) was 40%.

The voltage of the 200 unit cells was average voltage ±1% or less. Also, the temperature was measured by inserting a thermocouple into a central portion of the membrane electrode assembly 23 on the oxidizer electrode side of each of Nos. 1, 10, 20, 30, ..., 190, and 200. Consequently, the temperature was average temperature ±1% or less in all the unit cells. In addition, the voltage was stable regardless of the stack installation angle.

As described above, water could be supplied to the fuel gas by effectively using the capillarity in the water supply flow paths 24 regardless of the stack installation angle, and no water stayed in the fuel gas flow paths. Also, the fuel gas and water were evenly mixed in the fuel gas flow paths, and this made the pressure distribution in the water supply path 18 more uniform. As a consequence, each unit cell had uniform humidifying conditions, a uniform voltage distribution, and a uniform temperature distribution, so stable power generation was possible.

The second embodiment (the arrangement shown in FIG. 3) described above can be applied to the whole first embodiment described earlier.

(Third Embodiment)

Figures 4A, 4B:
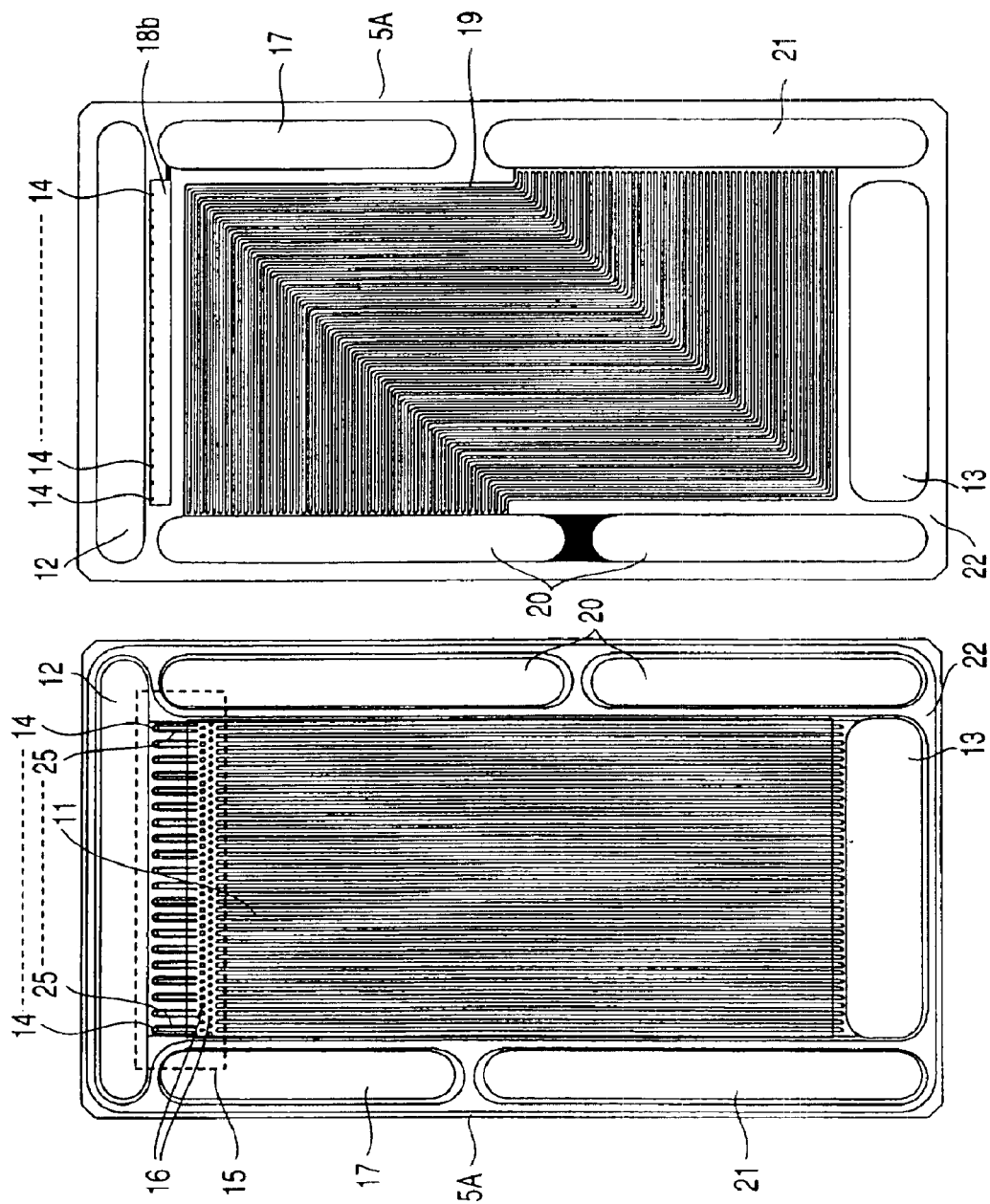
FIGS. 4A and 4B are views for explaining a separator of a polymer electrolyte fuel cell stack according to the third embodiment of the present invention.
Figure 5:
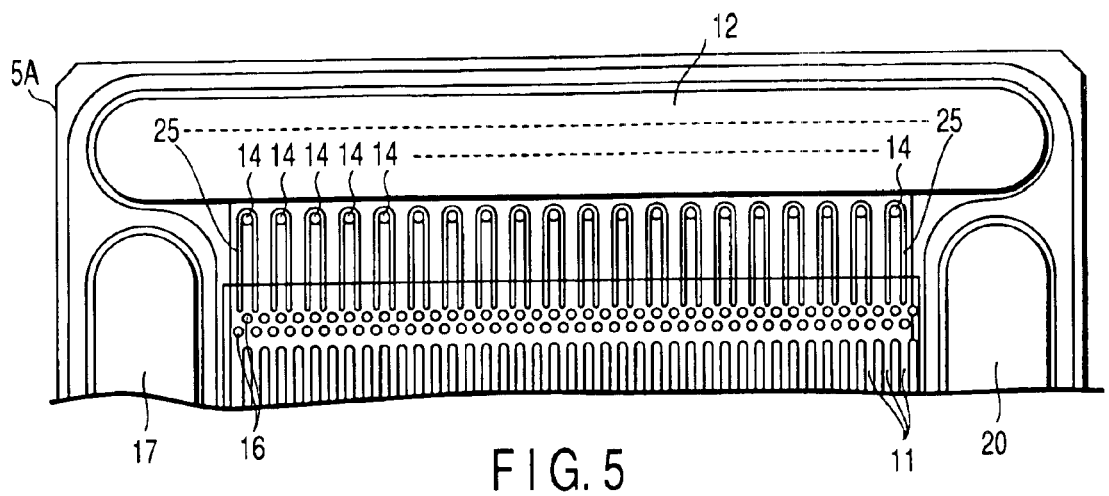
FIG. 5 is a view showing a portion of FIG. 4A in an enlarged scale.

FIG. 4 is a view showing a separator to explain a polymer electrolyte fuel cell stack according to the third embodiment of the present invention. Similar to FIGS. 2A and 2B, FIGS. 4A and 4B are front views showing one plate surface (a surface in which fuel gas flow paths 11 are formed) and the other plate surface (a surface in which oxidizer gas flow paths 19 are formed), respectively, of one separator 5A. FIG. 5 is a front view showing a portion of FIG. 4A in an enlarged scale.

This embodiment is the same as the embodiment shown in FIG. 2 in that a plurality of fuel gas flow paths 11 formed in one plate surface of each separator 5A are made substantially linear in the vertical direction, and different from the embodiment shown in FIG. 2 in the following respect.

That is, an arrangement capable of supplying water to the fuel gas flow paths 11 includes a water manifold 17 formed to extend through each separator 5A, a third water supply path 18b positioned, in the surface in which the oxidizer gas flow paths 19 are formed, above the lowermost portion in the vertical direction of the water manifold 17, and formed in the horizontal direction, a plurality of communication holes 14 formed at equal intervals in the water supply path 18b so as to allow the water supply path 18b to communicate with the fuel gas flow paths 11, and a plurality of fourth water supply flow paths 25 formed in that surface of the separator 5A, in which the fuel gas flow paths 11 are formed, in order to allow the communication holes 14 to communicate with the fuel gas flow paths 11. In this structure, the projecting sectional shape of the fourth water supply path 25 is formed into, e.g., a deformed U shape. This is equivalent to forming trenches in the plate surface of the separator 5A.

A plurality of projections 16 are formed in a grid or zigzag pattern between a position about, e.g., 2 cm below the communication holes 14 and the fuel gas flow paths 11, so that water supplied each communication hole 14 to the fuel gas is evenly mixed. The rest of the arrangement is the same as shown in FIG. 2.

More specifically, the array pitch of the fuel gas flow paths 11 is, e.g., 3 mm, and the number of fuel gas flow paths 11 is 40. Each fuel gas flow path 11 is straight flow in the vertical direction, and extends from a fuel gas inlet gas manifold 12 in the upper portion to a fuel gas outlet gas manifold 13 in the lower portion.

The array pitch of the communication holes 14 is 6 mm, the number of communication holes 14 is 20, and the diameter of the communication holes 14 is 0.5 mm. The communication holes 14 are horizontally arranged in a fuel gas flow path introducing portion 15.

A polymer electrolyte fuel cell stack having a repetitive structure of unit cell main components in which the separators 5A having the above arrangement and film electrode composite bodies 23 (not shown, electrode area=288 $cm^2$) were adjacent to each other, and the number of film electrode composite bodies 23 (the number of unit cells) as shown in FIG. 1 was 200 was manufactured by way of trial. A power generation test was conducted by horizontally installing the stack. The standard operating conditions were set such that reactant gases were hydrogen gas/air, the reactant gas pressure was 1 ata, the current density was 0.2 $A/cm^2$, the fuel gas utilization (Uf) was 70%, and the oxidizer gas utilization (Uox) was 40%. Also, vibrations were intermittently given to the stack, and the behavior of the voltage was monitored.

The voltage of the 200 unit cells was average voltage ±1% or less. Also, the temperature was measured by inserting a thermocouple into a central portion of the membrane electrode assembly 23 on the oxidizer electrode side of each of Nos. 1, 10, 20, 30, ..., 190, and 200. Consequently, the temperature was average temperature ±1% or less in all the unit cells. In addition, the stack voltage was stable even when intermittent vibrations were repeated.

In the third embodiment described above, when water was supplied to the fuel gas, the pressure loss in the fourth water supply paths 25 increased, intermittent vibrations given to the stack had no influence, and no water stayed in the fuel gas flow paths. Also, the fuel gas and water were mixed in the fuel gas flow paths 11.

As a consequence, even when vibrations are intermittently given to the stack, water supplied to the fuel gas evenly flows, and each unit cell has uniform humidifying conditions, a uniform voltage distribution, and a uniform temperature distribution, so stable power generation is possible.

(Fourth Embodiment)

In the fourth embodiment, a capillarity generating means made of, e.g., a hydrophilic porous material is filled in the water supply path 18 shown in FIG. 2 explained earlier. The rest of the arrangement is the same as shown in FIGS. 1 and 2.

With this arrangement, when water supplied to the water supply path 18 is guided to communication holes 14, the flow of the water is accelerated by capillarity generated by the capillarity generating means. As a consequence, the stack installation angle has no influence, no water stays in fuel gas flow paths, and a fuel gas and water in the fuel gas flow paths are mixed more evenly. This makes the pressure distribution in the water supply path 18 more uniform, and allows more stable power generation.

When the capillarity generating means described above is filled in the first water supply path 18a shown in FIG. 3, filled in each second water supply path 24 shown in FIG. 3, formed across the second water supply paths 24 shown in FIG. 3 so as to cover the second water paths 24, filled in the first water supply path 18a, filled in the third water supply path 18b shown in FIG. 4, or filled in each fourth water supply path 25 shown in FIG. 5, the capillarity of the capillarity generating means can be effectively used, so the same effect as described above can be expected.

(Modifications)

The present invention is not limited to the above embodiments, and can be modified as follows.

The separator 5A of the above embodiments is an integrated separator having one surface in which the fuel gas supply paths 11 are formed and the other surface in which the oxidizer gas supply paths 19 are formed. However, it is also possible to separately prepare a portion in which the fuel gas supply paths 11 are formed and a portion in which the oxidizer gas supply paths 19 are formed, and adhere these portions or simply bring these portions into contact with each other.

Also, in the separators 5A arranged between the film electrode composite bodies 3, the fuel gas supply paths 11 and oxidizer gas supply paths 19 are formed as shown in FIG. 1. However, the separator 5A placed at the end portion such as a portion close to the case of the unit cell is, of course, either a separator in which only the fuel gas supply paths 11 are formed or a separator in which only the oxidizer gas supply paths 19 are formed.

Furthermore, the fuel gas supply paths 11 and oxidizer gas supply paths 19 formed in the separator 5A in the above embodiments are explained by taking trenches as an example, and the water supply paths 18, 18a, 18b, 24, and 25 are explained by taking trenches as an example. However, any of these supply paths may also be a hole, a hole containing a porous material as a pressure reducing element, a pipe, or a fuel gas supply path or oxidizer gas supply path obtained by forming a porous material as a pressure reducing element in a pipe.

Of the arrangement shown in FIG. 3, an arrangement in which the sectional area, e.g., the width decreases away from the water manifold 17 is applicable to both the first and third embodiments.

Also, the above embodiments are explained by taking an example in which water is supplied to the fuel gas introducing portion 15 as the fuel gas supply paths 11. However, the position of water supply may also be the middle of the fuel gas supply paths 11.

Furthermore, in the above embodiments, the plurality of communication holes 14 formed in the separator 5A are arranged at equal intervals as the best mode. However, the intervals need not always be the equal intervals.

The polymer electrolyte fuel cell main body and polymer electrolyte fuel cell power generation system of the present invention can also be used as various power supplies, e.g., a vehicle power supply and stationary power supply.

What is claimed is:

1. A polymer electrolyte fuel cell stack comprising a plurality of unit cell main components juxtaposed in the same direction and electrically connected in series with each other, each unit cell main component comprising:

a membrane electrode assembly including a proton exchange membrane, and a fuel electrode and oxidizer electrode placed on opposing plate surfaces of the proton exchange membrane;

a separator including a plurality of first reactant gas flow paths to supply a first reactant gas, formed substantially linearly in a vertical direction in a first plate surface to be brought into contact with one of the fuel electrode and the oxidizer electrode, and a plurality of second reactant gas flow paths to supply a second reactant gas, formed in a second plate surface of the separator; and water supply means for cooling the unit cell main component by a latent heat system by supplying water to the first reactant gas flow paths, the water supply means including a manifold formed in the vertical direction to extend through the separator, a first water supply path positioned, in the surface in which the second reactant gas flow path is formed, above a lowermost portion in the vertical direction of the manifold, and continuously formed in a horizontal direction, a plurality of through holes formed with a predetermined spacing from the first water supply path so as to communicate with the first reactant gas flow paths, and a plurality of second water supply flow paths which are formed between the through holes and the first water supply path so as to allow the through holes to communicate with the first water supply path, and which guide water in the first water supply path to the through holes.

2. A polymer electrolyte fuel cell stack comprising a plurality of unit cell main components juxtaposed in the same direction and electrically connected in series with each other, each unit cell main component comprising:

a first membrane electrode assembly including a proton exchange membrane, and a fuel electrode and oxidizer electrode placed on opposing plate surfaces of the proton exchange membrane;

a separator including, a plurality of fuel gas flow paths to supply a fuel gas, formed substantially linearly in a vertical direction in a first plate surface to be brought into contact with the fuel electrode, and an oxidizer gas flow path to supply an oxidizer gas, formed in a second plate surface to be brought into contact with an oxidizer electrode of an adjacent second membrane electrode assembly different from the first membrane electrode assembly; and water supply means for cooling the unit cell main component by a latent heat system by supplying water to the fuel gas flow paths, the water supply means including a water manifold fanned in the vertical direction to extend through the separator, a first water supply path positioned, in the surface in which the oxidizer gas flow path is formed, above a lowermost portion in the vertical direction of the water manifold, and continuously formed in a horizontal direction, a plurality of through holes formed with a predetermined spacing from the first water supply path so as to communicate with the fuel gas flow paths, and a plurality of second water supply flow paths which are formed between the through holes and first water supply path so as to allow the through holes to communicate with the first water supply path, and which guide water in the first water supply path to the through holes.

3. The polymer electrolyte fuel cell stack according to claim 2, further comprising:

a plurality of third water supply paths which are formed in the surface of the separator in which the fuel gas flow paths are formed and which guide water supplied from the through holes to the fuel gas supply paths.

4. The polymer electrolyte fuel cell stack according to claim 1, further comprising:

a plurality of third water supply paths which are formed in the surface of the separator in which the first reactant gas flow paths are formed and which guide water supplied from the through holes to the first reactant gas supply paths.

5. A polymer electrolyte fuel cell stack according to claim 1, wherein a sectional area of the first water supply path branched from the water manifold decreases away from the water manifold.

6. A polymer electrolyte fuel cell stack according to claim 2, wherein a sectional area of the first water supply path branched from the water manifold decreases away from the water manifold.

7. A polymer electrolyte fuel cell stack according to claim 3, wherein a sectional area of the first water supply path branched from the water manifold decreases away from the water manifold.

8. A polymer electrolyte fuel cell stack according to claim 4, wherein a sectional area of the first water supply path branched from the water manifold decreases away from the water manifold.

* * * * *